June 20, 1961 W. A. SCHAICH 2,988,776
METHOD AND APPARATUS FOR TRIMMING BLOWN HOLLOW PLASTIC ARTICLES
Filed July 27, 1959 4 Sheets-Sheet 1
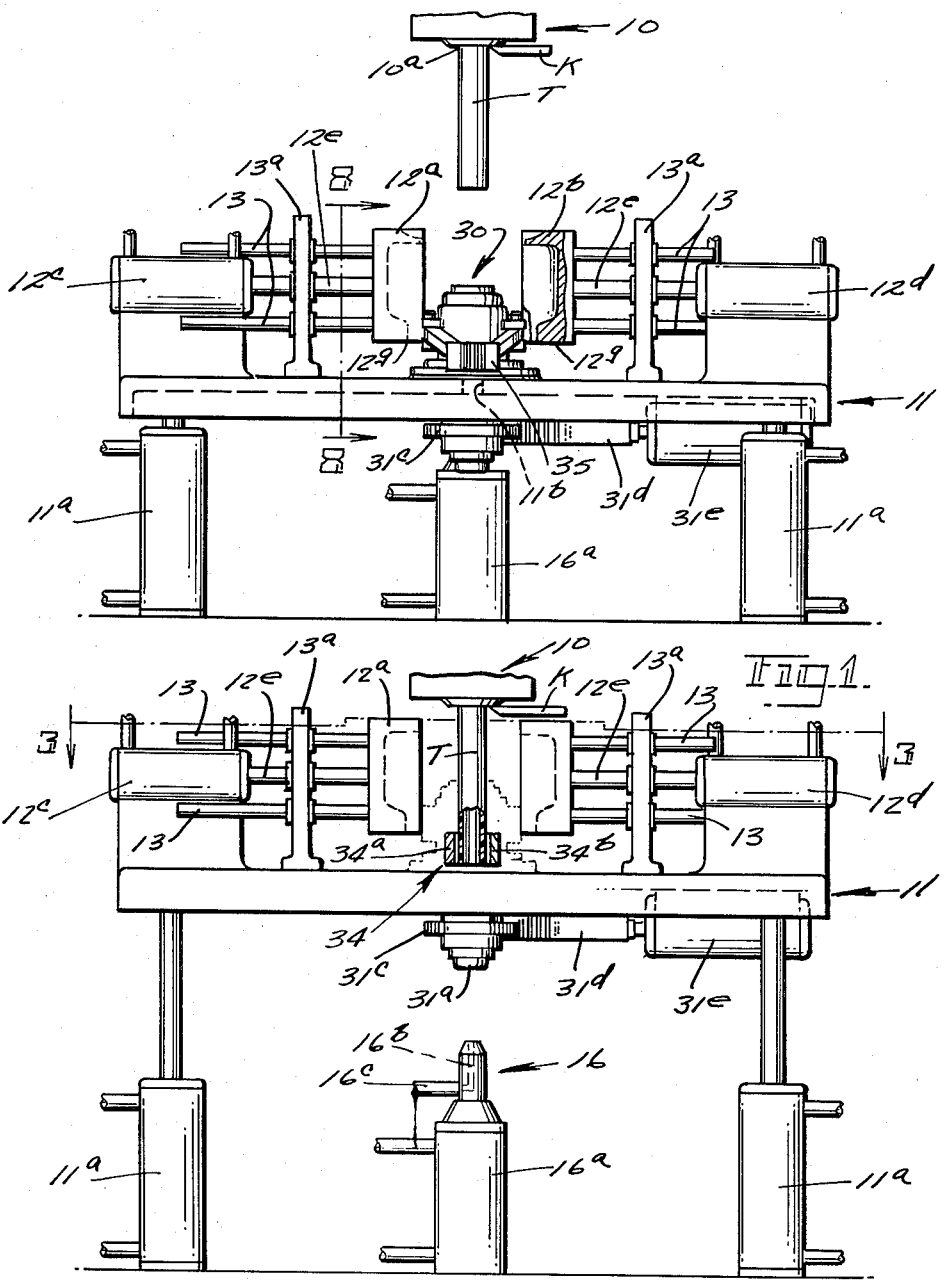
INVENTOR.
WILBUR A. SCHAICH
BY
J. R. NELSON
W. A. SCHAICH
ATTORNEYS

INVENTOR.
WILBUR A. SCHAICH
BY J. R. NELSON
W. A. SCHAICH
ATTORNEYS

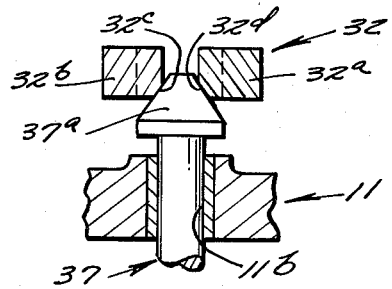
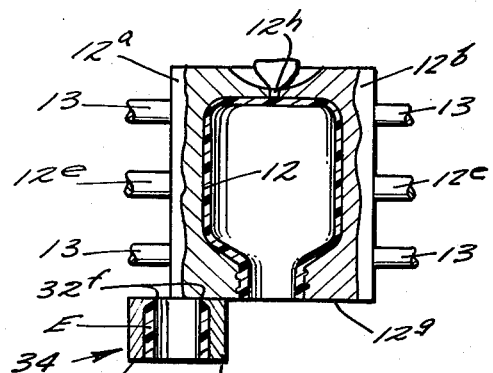
Fig. 10.
Fig. 7.
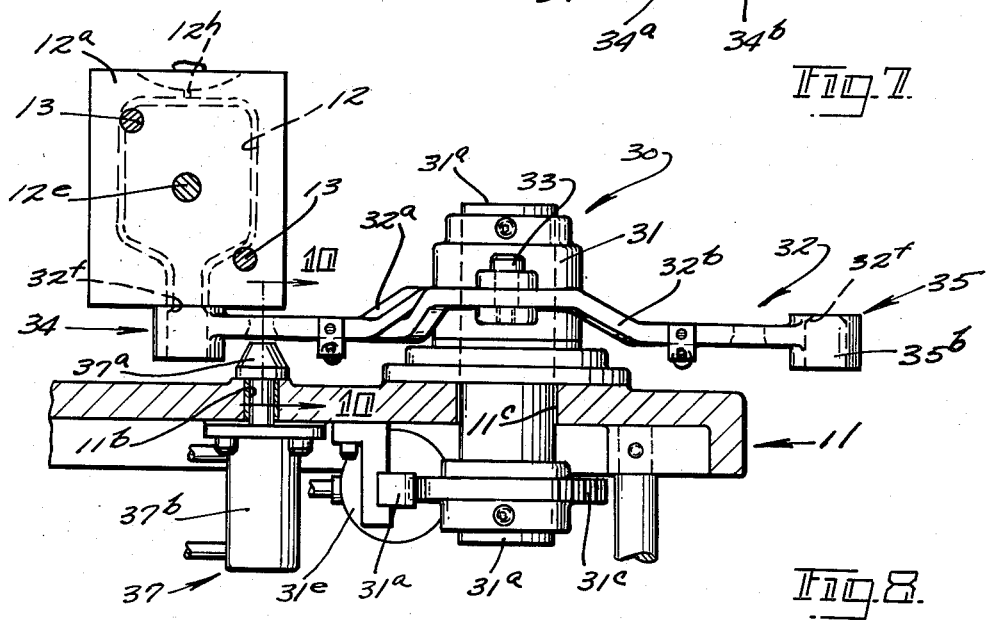
Fig. 8.
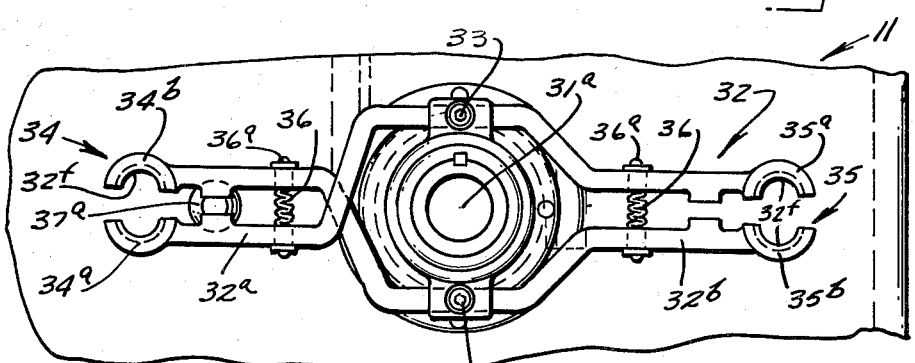
Fig. 9.
INVENTOR.
WILBUR A. SCHAICH
BY
J. R. NELSON
W. A. SCHAICH
ATTORNEYS

United States Patent Office 2,988,776
Patented June 20, 1961

2,988,776
METHOD AND APPARATUS FOR TRIMMING BLOWN HOLLOW PLASTIC ARTICLES
Wilbur A. Schaich, Maumee, Ohio, assignor to Owens-Illinois Glass Company, a corporation of Ohio
Filed July 27, 1959, Ser. No. 829,693
4 Claims. (Cl. 18—5)

The present invention relates to a method and apparatus for blow molding hollow articles, such as bottles, and the like, from heat-softened plastic tubing, and more particularly to an improved apparatus for centering and holding the plastic tubing in registered alignment with the blowing apparatus, and a novel method and apparatus for removing residual excess plastic from the formed article.

Heretofore, it has been conventional in the art of blow molding hollow plastic articles, such as dolls, bottles, and the like, to extrude a tubular formation of heat-softened plastic and to thereafter expand the plastic tube within the confines of a segmental blow mold defining an interior configuration conforming to the shape of the desired article. A method and apparatus of this general type is described and claimed in my copending application Serial No. 768,526 filed October 16, 1958.

According to the method disclosed in such copending application a heated length of thermoplastic tubing is extruded in a vertically downward direction and a pair of mold sections are closed around the extruded length of tubing. To insure that the tubing will be properly positioned relative to the mold sections, the free end of the tubing is caused to enter an aperture which is disposed in a bedplate provided below the bottom face of the mold sections. After closing of the mold sections, the enclosed portion of the plastic tubing is expanded to conform to the molding cavity and the blown article is removed by opening the mold sections. Necessarily, there will be a length of excess plastic tubing formed integrally on the bottom end of the blown article and it is desirable to effect the severance of such excess length of tubing from the blown article prior to removal of the blown article from the molds. This is accomplished in accordance with the methods and apparatus of my prior copending application by passing a severing element through the tubing in the plane of the bottom face of the sectional mold.

Apparatus of this general type have two major disadvantages. In the first place the tube positioning aperture in the mold bedplate has to be made substantially larger than the diameter of the extruded tubular formation in order to insure that the bottom free end of the tube would always enter the aperture. The larger the aperture was made, the less would be the positioning action of such aperture so that the tube could be in a position of substantial misalignment with the extrusion axis at the instant that the sectional mold was closed thereareound. Secondly, and more importantly, the disposition of the severed piece of excess tubing was a problem in that such severed length lies directly in the path of the blow nozzle by which the mold enclosed portions of tubing are expanded to conform to the mold cavity. While mechanical means can be provided for removing such excess severed length of tubing from the apparatus, such additional mechanical means have heretofore resulted in an expensive modification of the blow molding machine.

Accordingly, it is an object of this invention to provide an improved method and apparatus for effecting both the initial positioning of a vertically extruded length of plastic tubing with respect to a sectional blow mold and the severance and removal of the excess length of plastic projecting out of such blow mold after completion of the blowing of the mold enclosed length of tubing to conform to the mold cavity.

Still another object of this invention is to provide an improved method and apparatus for severing and disposing of an excess length of plastic tubing projecting out of a face of a sectional mold within which the mold enclosed portions of the tubing are expanded.

The specific nature of this invention, as well as other objects and advantages thereof, will become apparent to those skilled in the art from the following detailed description, taken in conjunction with the annexed sheets of drawings, on which, by way of preferred example only, is illustrated a preferred embodiment of this invention.

On the drawings:

FIG. 1 is a side elevational view, partly in section, of a blow molding machine embodying this invention, showing the elements of the machine in the starting position of the blow molding cycle.

FIG. 2 is a view similar to FIG. 1 but indicating the elements of the machine in their second position in the cycle wherein the mold bed is elevated relative to the extruder and the bottom end of the extruding plastic tube is inserted in the tube positioning mechanism.

FIG. 7 is an enlarged scale fragmentary sectional view of a portion of FIG. 6 illustrating the step of severance and disposition of the excess length of plastic tubing projecting out of the mold face.

FIG. 8 is an enlarged scale sectional view taken on the plane 8—8 of FIG. 1.

FIG. 9 is a top elevational view of FIG. 8.

FIG. 10 is an enlarged scale sectional view taken on the plane 10—10 of FIG. 8.

As shown on the drawings:

Figure 3:
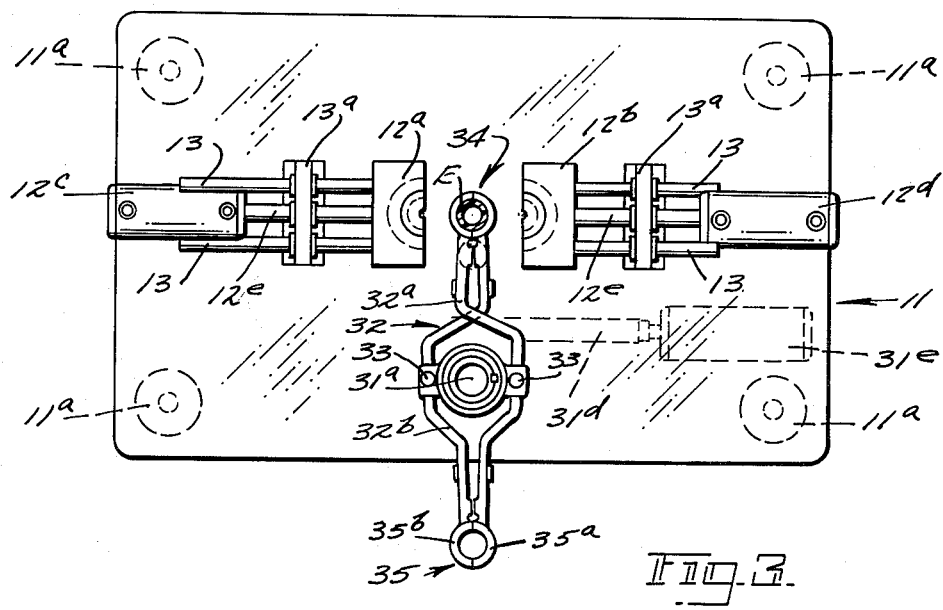
FIG. 3 is a sectional view taken on plane 3—3 of FIG. 2.

A plastic blowing machine of the type to which the method and apparatus of this invention are applicable conventionally comprises an extruder 10 having a downwardly directed annular orifice 10a capable of continually issuing therefrom in freely pendant relationship, a hollow tubular formation T of plastic material, which is at a suitable temperature to permit subsequent expansion and setting in a mold. While conventional temperature controls or orifice adjustments (not shown) may be incorporated in the extruder 10 to insure that the extruded plastic tubular formation T will lie substantially in alignment with the vertical axis of the extruder orifice 10a, nevertheless, in normal operating procedure the freely pendant plastic tube does tend to curl somewhat out of axial alignment with the extruder axis.

A mold bed 11 is provided which is capable of vertical movements relative to the extruder orifice 10a. Preferably mold bed 11 comprises a horizontal plate-like element which is supported at its opposed ends by a pair of vertically disposed fluid pressure cylinders 11a which effect upward and downward movements of the mold bed 11 relative to the extruder orifice as required to comply with the process of this invention. In the central portion of mold bed 11, a vertical aperture 11b is provided in alignment with the extrusion axis and of sufficient size to accommodate a tubular blow nozzle 16 which is mounted coaxially with respect to the extrusion axis and whose vertical position is controlled by a fluid pressure cylinder 16a. Nozzle 16 has a hollow bore 16b through which pressured fluid may be supplied by virtue of a connection pipe 16c.

A pair of partable mold sections 12a and 12b are provided, which, when closed, define a molding cavity 12 corresponding to the configuration of the plastic article desired. The mold sections 12a and 12b are laterally shiftable with respect to the mold bed 11, and may be mounted in any conventional fashion for horizontal sliding movements with respect to the mold bed 11, such, for example, as being supported by a plurality of slide rods 13 which are horizontally slidably supported respectively by a pair of upstanding bearing plates 13a respectively mounted on the mold bed 11 on opposite sides of the extrusion axis. A pair of fluid-actuated cylinders 12c and 12d are respectively provided for the mold sections 12a and 12b and are mounted on the outer extremities of mold bed 11 and respectively control the lateral shifting movements of such mold sections relative to the mold bed 11, the pistons portions 12e and 12f of such cylinders extending through suitable slide bearings in the bearing plates 13a.

When it is desired to form a hollow plastic container having a neck opening, such as a bottle configuration illustrated by mold cavity 12, the mold sections 12a and 12b cooperate when closed to define the mold cavity 12 in coaxial relationship to the extrusion axis, but in an inverted position so that the end face of the neck of the desired container will be disposed in the same plane as the bottom face 12g of the mold sections 12a and 12b.

Referring particularly to FIGS. 1, 8, and 9, a combined tube positioning, severing and disposition unit 30 embodying this invention is also mounted on mold bed 11. Unit 30 comprises a supporting hub 31 to which are respectively pivotally mounted the arms 32a and 32b of a pair of tongs 32. While a single pair of tongs 32 will accomplish the objectives of this invention, additional advantages may be derived by utilizing two pairs of such tongs which may be disposed in diametrically opposed relationship relative to each other. Thus the tong arm 32a is medially pivoted on a vertical pivot pin 33 to the hub 31. The opposite ends of tong arm 32a are respectively provided with semi-annular tube positioning hubs 34a and 35a. The tong arm 32b is similarly medially pivotally mounted to the opposite side of the support hub 31 and at its opposite ends defines semi-annular tube positioning hubs 34b and 35b respectively. The tong arms 32a and 32b are normally biased by extension springs 36 mounted therebetween to a position wherein the semi-annular hubs 34a and 34b are in abutment and concurrently the semi-annular hubs 35a and 35b will similarly be in abutment. The tension springs 36 are respectively mounted on bolt-like members 36a which respectively traverse the tong arms 32a and 32b at points between the ends thereof and their pivotal mounting pins 33.

A tong opening device 37 is provided comprising a wedge-shaped plunger 37a mounted in a suitable vertical bearing aperture 11b in mold bed 11 and operable by a fluid cylinder 37b. The tapered portion of actuating plunger 37 engages correspondingly shaped camming surfaces 32c and 32d respectively provided on the tong arms 32a and 32b. Thus vertically upward movements of the actuating plunger 37a will effect a spreading of the tong arms 32a and 32b to simultaneously open both ends of the tongs 32. Retraction of the actuating plunger 37 permits the rapid closing of both ends of the tongs under the influence of the tension springs 36. When closed, the semi-annular tong ends cooperate to define hubs 34 and 35.

The tong support hub 31 is suitably secured to a vertical shaft 31a which is journaled in a suitable vertical aperture 11c in mold bed 11 and projects through the bottom surface of such mold bed. Any conventional mechanism may be provided for rotating or reciprocating the shaft 31a between angularly displaced positions. In the specific example illustrated in the drawings, such intermittent rotation or oscillation of shaft 31a should preferably be through 180° intervals so that the tong ends 24a—34b and 35a—35b may be alternately disposed in alignment with the axis of extrusion. Thus a gear 31c may be secured to the bottom end of the shaft 31a and actuated by a cooperatnig rack 31d which in turn is reciprocated by a fluid cylinder 31e mounted on the bottom face of mold bed 11.

The vertical position of the tong arms 32a and 32b is such that the semi-annular ends thereof have their top faces disposed in the same plane as the bottom faces 12g of the mold sections 12a and 12b. A semi-annular cutting edge 32f (FIG. 7) is formed on the top internal surface of each of the semi-annular hubs. These cutting edges effect the severance of the projecting length of excess plastic tube projecting out of mold face 12g in a manner that will be hereafter described.

The operation of the aforedescribed mechanism in accordance with this invention will now be outlined. Referring to FIG. 1, the elements of the machine are shown in their starting position of a blowing cycle, which of course also corresponds to the final position of such elements after the desired article has been formed and removed from the machine. The mold bed 11 is in its lowermost position and the one set 34 of tong hubs is positioned in alignment with the extrusion axis and the tong actuating plunger 37 is in its raised position to shift the semi-annular tube positioning tong ends 34a and 34b to their spread or open position. A length of plastic tubing approximately equal to that required to form the desired article has been extruded by the extruder 10.

In the next step of the operation, illustrated in FIG. 2, the extruder 10 has completed the extrusion of a length of tubing T which is of greater overall vertical length than the mold cavity of the cold sections 12a and 12b and the mold bed 11 has been elevated, hence the free end of the extruded tubing enters the expanded aperture defined by the separated semi-annular tong hubs 34a and 34b as the mold bed 11 is elevated to its uppermost position. The tong actuating plunger 37 is then partially retracted by cylinder 37b to permit the semi-annular tong hubs to partially close upon the free end of the extruded tubing T and thus position such free end in axial alignment with the extruder axis. It should be particularly noted that the tong hub 34 is not completely closed at this stage for when the hubs are thus closed, the resulting aperture defined between the opposed semi-annular knife edges 32e is less than the internal diameter of the extruding tubing T and would effect a severance of such tubing. The tongs are closed sufficiently to grasp the tubing and position it properly with respect to the extrusion axis and hence with respect to the cavity 12 of the mold sections 12a and 12b.

Figure 4:
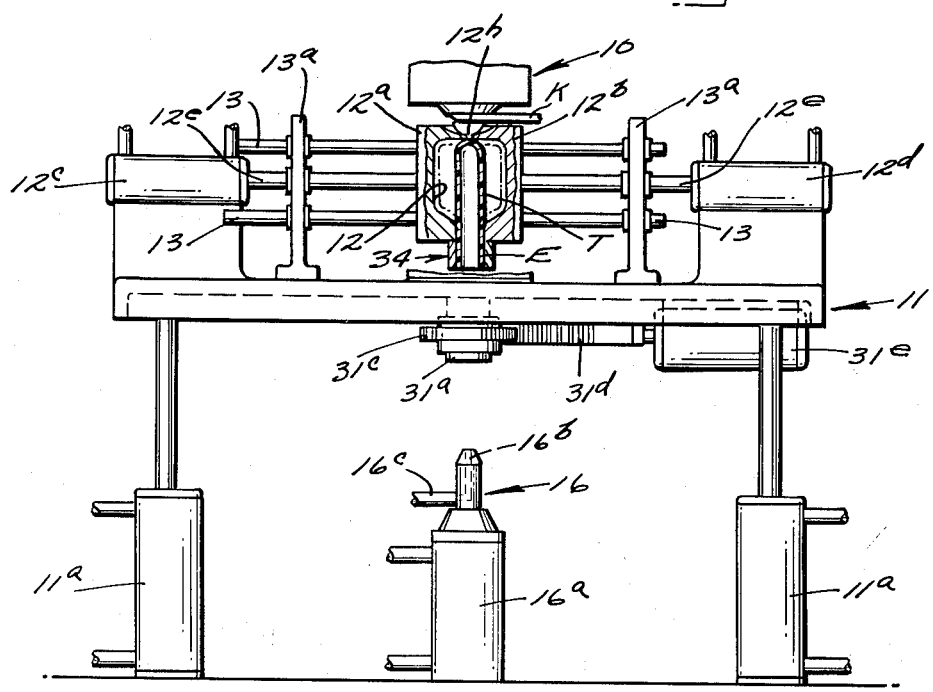
FIG. 4 is a view similar to FIG. 1 but showing the elements of the machine in the next step of the blow molding process wherein the sectional mold is closed around the extruded tube and the extruded length of tubing is severed from the extruder.

The mold sections 12a and 12b are then closed about the extruded length T of thermoplastic tubing with their bottom faces 12g in tight contiguous engagement with the top surfaces of the semi-annular tong hubs 34a and 34b. Concurrently with the closing of the mold sections 12a and 12b, the top confronting edges 12h of such mold sections achieve a pinching and sealing action on the top end of the plastic tubular formation enclosed in such mold (FIG. 4.)

At this point a tube-severing knife K located in close proximity to the extruder orifice 10a is actuated to sever the extruded length of tubing from the oncoming tubing. The severing is accomplished in such manner as to leave the severed ends open. Concurrently with the severing, or immediately thereafter, the mold bed 11 is moved downwardly to the position shown in FIG. 5 to space apart the severed ends of the tubing.

Figure 5:
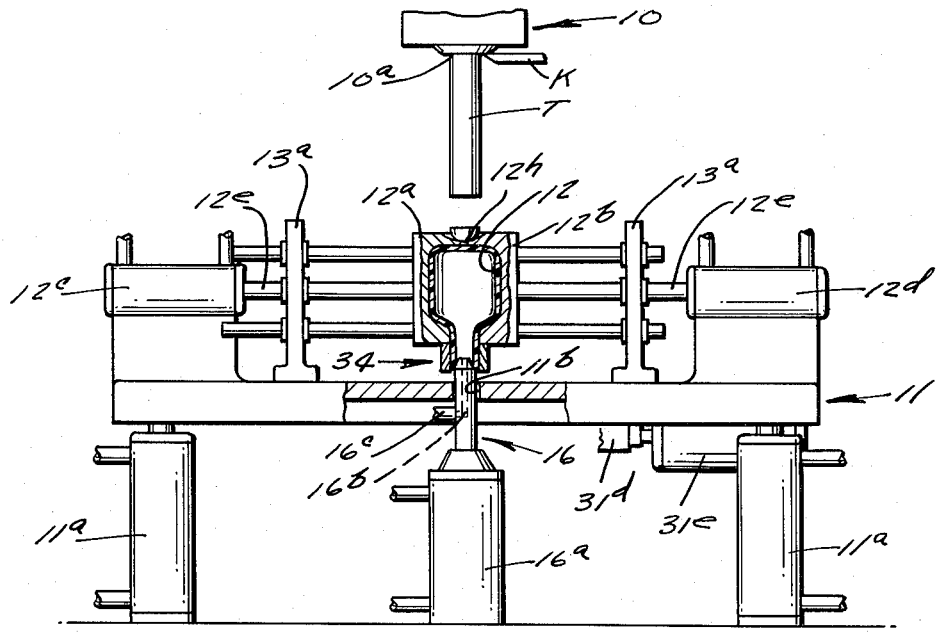
FIG. 5 is a view similar to FIG. 1 but illustrating the next step of the blow molding cycle wherein the mold bed is lowered and the mold enclosed length of tubing is expanded to conform to the mold cavity.
Figure 6:
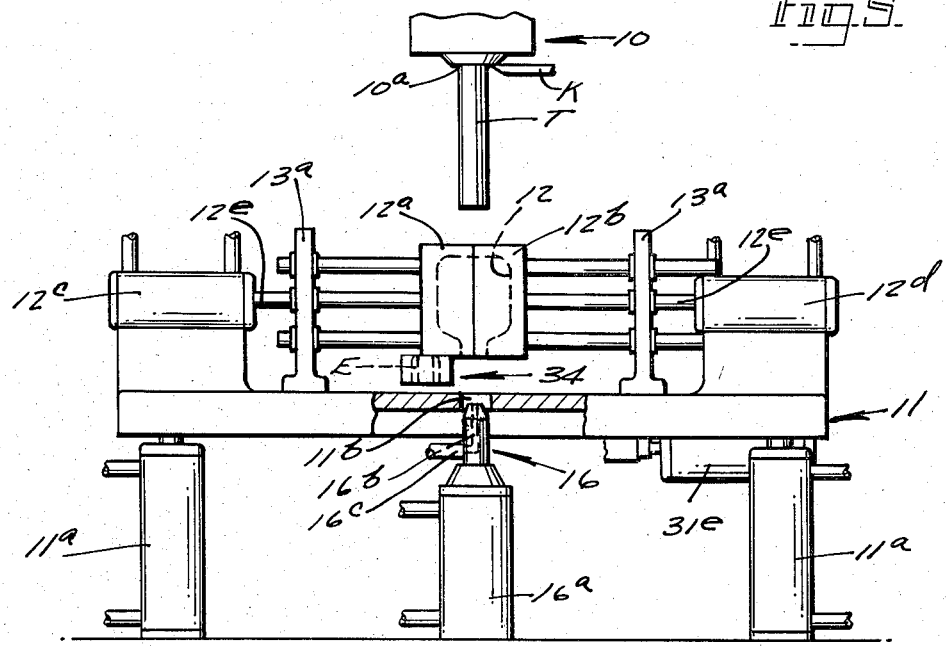
FIG. 6 is a view similar to FIG. 1 but illustrating the final step of the blow molding cycle wherein the excess length of plastic tubing projecting out of the sectional mold is severed and removed to a remote position for disposition.

The next step of the process, as illustrated in FIG. 5, comprises the actuation of the blow head cylinder 16a to elevate the blow head 16 and cause the tapered end thereof to enter that portion of the tubing which is restrained by the tong hub 34. Pressured fluid is then supplied through blow head 16 to expand the mold enclosed portion of the plastic tube to correspond to the molding cavity defined by the sectional molds 12a and 12b.

The same fluid pressure will force the excess portion E of tubing projecting out of the bottom face 12g of the mold sections into snug engagement with the opposed internal walls of the semi-annular tong hubs 34a and 34b, and hence the maintenance of a fluid pressure seal between the blow head 16 and the interior of the plastic tubing T is assured.

Fluid pressure is maintained by blow head 16 for sufficient length of time to insure that the expanded plastic within the mold sections 12a and 12b is cooled to a self-supporting consistency. When this has been achieved, the blow head 16 is lowered and the next step of the process in accordance with this invention is the actuation of the plunger cylinder 37b to completely withdraw the actuating plunger 37 from engagement with the tong arms 32a and 32b. This permits the semi-annular tong hubs 34a and 34b to snap into their fully closed position under the influence of the tong springs 36 and such movement of the tong hubs effects a severing of the excess plastic projecting out of the end face 12g of the closed mold sections 12a and 12b. Subsequent to, or concurrent with, the closing of the tong hubs 34a and 34b, the tong rotating cylinder 31e is actuated to cause the rack 31d to rotate gear 31c through 180° and thus bodily move the one tong hub 34 to an 180° displaced position with respect to the extrusion axis and concurrently move the other tong hub 35 to the position formerly occupied by the tong hub 34. This bodily movement of the tongs of course carries the severed excess length of plastic E to a remote position relative to the extrusion axis.

Next the tong actuating plunger 37 is elevated to spread the tong hub 35 and this action concurrently opens the tong hub 34 and causes the severed excess length of plastic E to be dropped at a position 180° remote from the extruder axis. The mold sections 12a and 12b can then be moved outwardly by their respective cylinders to release the formed article which will come out of the molding cavity with the bottom end face thereof, or the top surface of the desired article, completely trimmed of excess plastic and providing a smooth configuration suitable for cooperation with a conventional closure.

From the foregoing description, it is apparent that the method and apparatus of this invention provides an unusually efficient, convenient and economical manner of first accurately positioning the extruded tubing with respect to the molding cavity, then automatically effecting the severance of the excess length of tubing projecting out of the molding cavity and then the removal of the severed excess length of tubing and disposition of such severed excess length of tubing at a position that will not interfere with subsequent operations of the machine.

The invention is claimed as follows:

I claim:

1. The method of forming hollow plastic articles comprising extruding a tubular formation of heated thermoplastic material, enclosing a portion of said extruded tubing in a sectional mold so that an open end portion of said tubing projects out of one face of said mold, freely surrounding said open end projecting portion of tubing by a variable aperture tube holding unit having an annular knife edge portion abutting said mold face, applying fluid pressure through said open end projecting portion of tubing to expand the mold enclosed portion of tubing to conform to said mold, contracting said tube holding unit to produce severance of the tubing at said mold face by said knife edge portion, shifting said tube holding unit to a remote position relative to the axis of said extrusion, and expanding said tube holding unit to release the severed piece of tubing at said remote position.

2. The method defined in claim 1 wherein a plurality of said tube holding units is provided and a second tube holding unit is moved to a position aligned with said extrusion axis concurrently with said shifting of the first tube holding unit to said remote position.

3. Apparatus for severing an end of a tubular thermoplastic formation projecting out of a face of a mold, comprising a pair of tongs having semi-annular opposed knife edges at their free ends, means for shiftably mounting said tongs relative to said mold so that said knife edges move along said mold face, means for opening and closing said tongs, whereby said knife edges may be spaced apart to permit insertion of said end therebetween, then moved towards each other to sever said end and means for shifting said tongs to a remote position relative to said mold while carrying the severed end therebetween.

4. The combination defined in claim 3 wherein a plurality of said pair of tongs is provided and said pairs are mounted on a common carrier, whereby movement of one pair of tongs to said remote position concurrently shifts a second pair of tongs to the same position relative to said mold face as originally occupied by said first pair of tongs.

References Cited in the file of this patent

UNITED STATES PATENTS

| | | |
|---|---|---|
| 2,166,563 | Wadsworth | July 18, 1939 |
| 2,898,633 | Burch | Aug. 11, 1959 |
| 2,928,120 | Leghorn et al. | Mar. 15, 1960 |